United States Patent [19]

Penna et al.

[11] Patent Number: 4,992,780

[45] Date of Patent: Feb. 12, 1991

[54] METHOD AND APPARATUS FOR STORING A TWO-DIMENSIONAL IMAGE REPRESENTING A THREE-DIMENSIONAL SCENE

[75] Inventors: David E. Penna, Red Hill, England; Eric H. J. Persoon, Eindhoven, Netherlands

[73] Assignee: U.S. Philips Corporation, New York, N.Y.

[21] Appl. No.: 251,633

[22] Filed: Sep. 29, 1988

[30] Foreign Application Priority Data

Sep. 30, 1987 [GB] United Kingdom ................. 8722900

[51] Int. Cl.⁵ .............................................. G09G 1/02
[52] U.S. Cl. .................................. 340/729; 340/703; 364/522
[58] Field of Search ............... 340/744, 729, 728, 701, 340/703, 734; 364/522; 358/22, 180, 182, 183

[56] References Cited

U.S. PATENT DOCUMENTS

| 4,408,198 | 10/1983 | Kudirka | 340/729 |
|---|---|---|---|
| 4,475,104 | 10/1984 | Shen | 340/729 |
| 4,509,043 | 4/1985 | Mossaides | 340/729 |
| 4,661,811 | 4/1987 | Gray et al. | 340/744 |
| 4,689,616 | 8/1987 | Goude et al. | 340/729 |
| 4,845,480 | 4/1989 | Satou | 340/744 |
| 4,875,097 | 10/1989 | Jackson | 340/729 |

FOREIGN PATENT DOCUMENTS 0116737 8/1984 European Pat. Off. .

Primary Examiner—Jeffery A. Brier
Attorney, Agent, or Firm—Anne E. Barschall

[57] ABSTRACT

A method of generating a two-dimensional image representing a three-dimensional scene is describerd. The method comprises: (a) storing a set of foreground pixel data and at least one set of background pixel data, each such set defining a color and a depth for each pixel of the image; (b) selectively modifying the stored foreground and background data in response to a series of input pixel data defining color and depth for a series of pixels of the image; and (c) forming output pixel data by combining the stored foreground and background color for each pixel in proportions defined by a mixing value associated with that pixel. In one embodiment, step (b) comprises selectively modifying the stored data depending on the input depths so that: (i) if the input depth is greater than the stored foreground and background depths, the stored foreground and background pixel data are left unchanged, (ii) if the input depth lies between the stored foreground depth and the stored background depth, the input pixel data is stored in place of the background data for that pixel, and (iii) if the input depth is less than both the stored foreground and background depths, the stored current foreground data for that pixel are stored in place of the stored background data and the input data are stored in place of the current foreground data. An arrangement is described for performing the method. The arrangement may form part of an electronic graphics system.

17 Claims, 9 Drawing Sheets

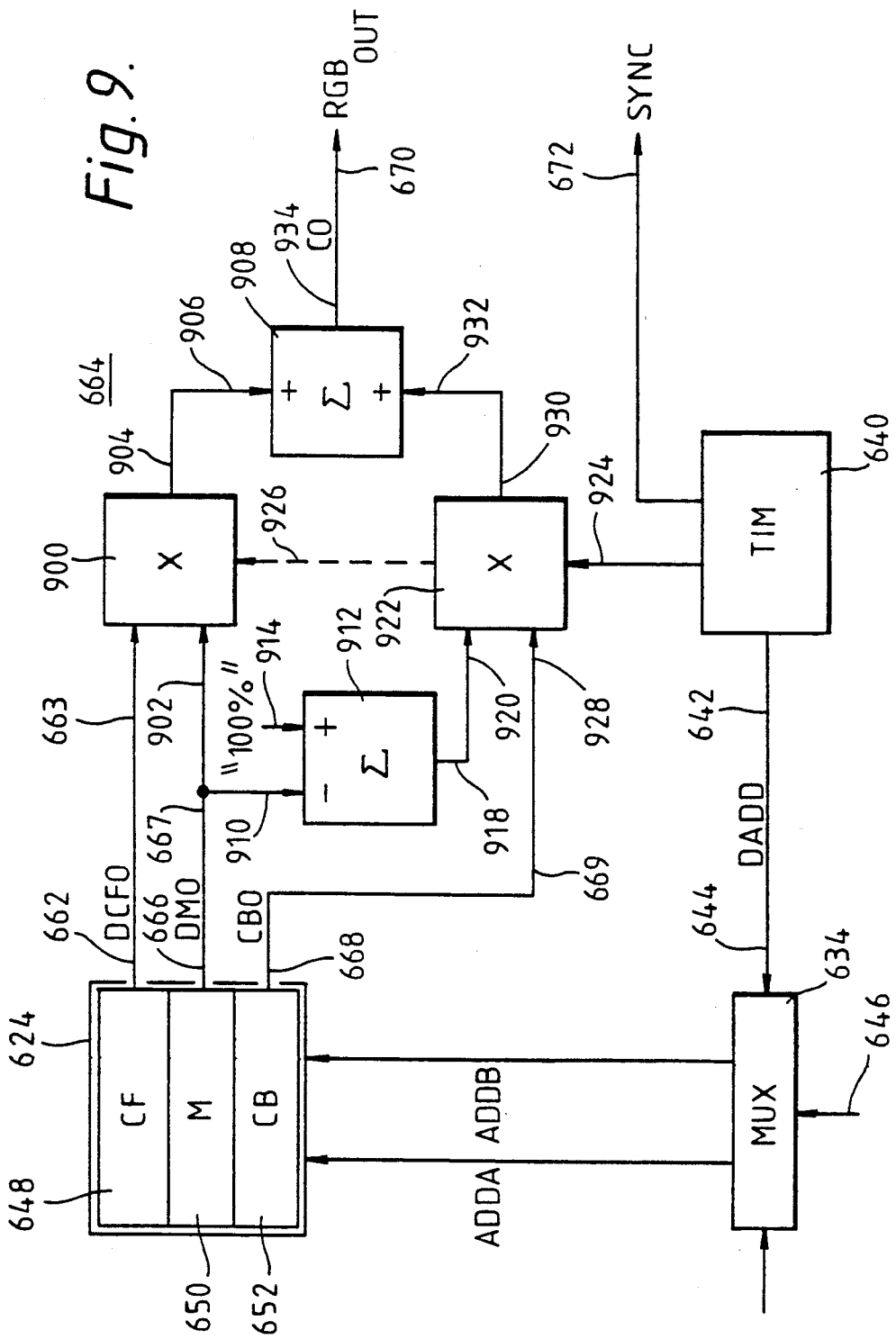

METHOD AND APPARATUS FOR STORING A TWO-DIMENSIONAL IMAGE REPRESENTING A THREE-DIMENSIONAL SCENE

DESCRIPTION

The invention relates to a method of generating in the form of an array of picture elements (pixels) a two-dimensional image representing a three-dimensional scene, the method comprising:
(a) storing in a memory a set of foreground pixel data defining a foreground colour and depth for each pixel of the image;
(b) selectively modifying the stored foreground data in response to a series of input pixel data defining colour and depth for a series of pixels of the image; and
(c) forming output pixel data using the stored foreground colour for each pixel.

The invention further relates to an arrangement for performing such a method and to an electronic graphics system including such an arrangement.

Such a method and arrangement are described for example in U.S. Pat. No. US-4 475 104. The method implements so-called 'depth buffer' or 'z-buffer' hidden surface removal (HSR) at the time of 'scan conversion' to ensure that the image of an object in the scene which has already been converted is not overwritten by input pixel data which arrives later but in fact corresponds to an object behind the one already stored. In depth-buffer HSR the stored foreground colour is only overwritten if the input depth is less than the stored foreground depth. The input depth is then stored as a new foreground depth. The depth buffer algorithm is described more generally in 'Principles of Interactive Computer Graphics' by W. M. Newman and R. F. Sproull at page 369, and has the advantages of simplicity and of not requiring knowledge of any object other than that being scan-converted at the time. The large memory required for the depth-buffer is becoming a less significant disadvantage as semiconductor memory increases in density and decreases in cost.

Often when generating images it is desirable to be able to assign a degree of transparency to an object to be represented so that the colour of the object behind the transparent object is mixed with the colour of the transparent object in the final image. The degree of transparency may be defined by a mixing value, and in known systems, the stored colour is read from a memory and mixed with the input colour to form a mixed colour, weighted in accordance with the mixing value. The mixed colour is then stored in the memory to form a new colour for that pixel.

As well as enabling scenes to be represented which contain transparent or partially transparent objects, there are other situations in which it is desirable to mix the colours of foreground and background objects in a single pixel. The term "transparency" will be used herein to refer to all such effects, whether they are provided to depict transparent objects or for different reasons. One effect falling into the latter category is so-called antialiasing which removes the jagged 'staircase' effects which can occur when sloping or curved edges between different-coloured regions are represented on a rectangular array of pixels. In antialiasing, the steps in the edge are disguised by calculating for the boundary pixels what fraction of the area of each pixel should ideally be on one side of the edge, and what fraction should be on the other side. These fractions (adding up to unity or 100 per cent) define the mixing value which is used to form a weighted average of the two colours that should ideally be represented in the pixel. Using a mixed colour for each pixel along the edge of a region of colour creates the impression of a continuously sloping line, even though the image is stored as an array of discrete, rectangular pixels.

Antialiasing has been described in, for example 'Principles of Interactive Computer Graphics' by W. M. Newman and R. F. Sproull, at pages 402 to 404. Various algorithms for calculating the mixing values are well known, for example from the last mentioned reference, at pages 236 to 239, and need not be described further herein. Antialiasing can be used either for two- or three-dimensional images, provided that the various regions of colour (polygons, for example) are written to the memory in a prearranged priority order. In 3-D applications, this means that each surface must be assigned a priority according to its depth "into" the scene, so that every polygon written is known to be in front of all the polygons already written. This requires a knowledge of all the polygons in a 3-D model 'world' (or at least those relevant to a given scan line) before writing can begin.

The simple antialiasing technique described, and other effects requiring transparency, have previously been incompatible with depth-buffer hidden surface removal (HSR) because, after the average colour value is calculated, another polygon may subsequently be written into the background or foreground of the scene and change the colour with which the input colour should have been averaged.

It is an object of the present invention to enable the generation of two-dimensional images representing three-dimensional scenes in a manner which provides for transparency while further affording the advantages of depth-buffer HSR.

The invention provides a method of generating images as set forth in the opening paragraph, characterized in that:
the step (a) further comprises storing at least one set of background pixel data, each such set defining a background colour and depth for each pixel of the image; in that
the step (b) comprises selectively modifying both the stored foreground and background data in response to the input pixel data; and in that
the step (c) comprises forming the output pixel data by combining the stored foreground and background colours for each pixel in proportions defined by a mixing value associated with that pixel.

By storing a foreground colour and a background colour or colours separately the background (and foreground) colours can be changed repeatedly, as new objects at different depths are converted, and mixed only when the final foreground and background colours have been determined. Storing both foreground and background depths enables depth-buffer HSR to be performed using the input depth.

The mixing value for each pixel may be dependent on the fractional area of that pixel which falls within the representation of a given surface in the three-dimensional scene. Such an embodiment retains the simplicity of the depth-buffer technique while effecting antialiasing to avoid 'staircase' effects. Alternatively or in addition, the mixing value may represent the transparency of objects in the scene generally.

The number of background sets of pixel data is a matter of choice for the designer. With only one background colour and depth stored for each pixel, only two colours can be mixed to create the final image in a simple embodiment. This is adequate to represent a single transparent surface, or to smooth the edges of an object represented against a single-colour background. However, in a typical scene, there is a sizeable minority of pixels for which ideal antialiasing requires a blend of three colours. To represent these situations faithfully, a second background set of data can be stored. It is a matter for the designer of the system to decide whether the improvement in the image at these relatively few locations justifies the cost of providing a further colour and depth buffer. Similarly, with three background sets of data, four colours could be mixed. However, in a scene where antialiasing is the only source of transparency, the number of locations where four-colour mixing is required will generally be negligible.

In one embodiment, the input pixel data includes a mixing value for each input pixel of the series and at least the stored foreground pixel data also includes a mixing value for each pixel of the image. In this embodiment, an antialiasing algorithm for example can simply generate the mixing values while scan-converting each polygon, without knowledge of other polygons or objects in the scene and without the need for priority sorting. Priority sorting is replaced by the action of storing the mixing value and the foreground until it is known what the appropriate colours for mixing are, that is after all polygons have been converted.

One mixing value is sufficient to define the relative weightings of two colours, one foreground and one background. If further sets of background data are stored additional mixing values must be stored also.

It may not be necessary to store the mixing value for every pixel, for example in cases where the antialiasing algorithm has knowledge of both adjacent polygons after conversion. In cases where the mixing value is used to represent transparency of an object generally, it may be stored or alternatively a particular mixing value may be associated with a particular colour, already stored. In the latter case, the mixing value can be calculated at the time of generating the output pixel data for display.

In step (b) the stored data may be selectively modified depending on the input depth so that (with depth increasing away from a notional viewer of the scene):

(i) if the input depth is greater than the stored foreground and background depths, the stored foreground and background pixel data are left unchanged, (ii) if the input depth lies between the stored foreground depth and the stored background depth, the input pixel data is stored in place of the background data for that pixel, and (iii) the input depth is less than both the stored foreground and background depths, the stored current foreground data for that pixel are stored in place of the stored background data and the input data are stored in place of the current foreground data. In this way, at any stage in the performance of step (b) of the method, the foreground data for each pixel represent the nearest surface plotted so far at that location and the background data represent the next nearest surface. Thus, at the termination of step (b), the correct foreground and background colours are available for mixing at each location where transparency is desired.

In the case (ii) above, the background data may however be left unchanged if a stored or received mixing value indicates that the foreground pixel at that location is not transparent. Similarly in the case (iii) the foreground data need not be re-stored as background data if a received mixing value indicates that the input pixel is not transparent.

In a serially executed implementation, for example when the method is performed by a computer under software control, this saves time by not writing irrelevant information.

In cases where the input depth is exactly equal to the background (or foreground) depth, a choice must be made of which of the two alternative procedures (i) and (ii) (or (ii) and (iii)) should be followed. The choice may be made arbitrarily, or to suit the nature of the particular implementation.

In one embodiment, in the case where the input depth is equal to the stored foreground depth, the procedure for case (iii) is followed if a received mixing value indicates that the input pixel is less transparent than the stored foreground pixel, procedure (ii) being followed when the stored pixel is less transparent.

In order to determine the relevant case (i), (ii) or (iii) the foreground and background depth and the mixing value (if required) may be read from a memory (RAM) in parallel. The foreground colour may be read from the RAM in parallel with the two depths. In cases (ii) and (iii) the new background colour and depth may be written into the RAM in parallel. In case (iii) the new foreground colour and depth (and the mixing value if stored) may be written into the RAM in parallel with the new background values. Parallel access to the RAM will generally afford a substantial speed advantage.

In step (c) the output colour for each pixel may be set directly to the foreground colour if the mixing value indicates that the foreground pixel is not transparent. This may afford a substantial speed advantage, since a relatively complex averaging calculation is then unnecessary for the great majority of pixels in a typical image.

In step (c) the stored foreground and background colours and the mixing value (if stored) may be read from a memory (RAM) in parallel for each pixel.

Also in step (c) the output colours may be formed in sequence according to a raster-scan pattern for synchronous display. The values so formed may be fed directly to a display device, such as a cathode ray tube (CRT), without the need for an intermediate conventional display RAM.

While the step (c) is being performed for one two-dimensional image, the steps (a) and (b) may be being performed to store a further image in a duplicate RAM. This enables continuous display of complete images, even though each image in a sequence may take longer than one frame period to generate.

Alternatively, the steps (a) and (b) may be performed for one line of the image and then the step (c) be performed for that line of the image, the output colours for the complete image being formed and stored line by line in a display memory. Treating each line separately means that the display memory need not store foreground and background colours and depths (and a mixing value or values if stored) for every pixel of the image at one time, only for the pixels of the current line.

In step (a) initial colours and depths may be stored to define a uniformly coloured and uniformly distant background for the image.

The invention further provides an arrangement for generating in the form of an array of picture elements (pixels) a two-dimensional image representing a three-dimensional scene, the arrangement comprising:

means for storing in a memory a set of foreground pixel data defining a foreground colour and depth for each pixel of the image;

means for selectively modifying the stored foreground data in response to a series of input pixel data defining colour and depth for a series of pixels of the image; and means for forming output pixel data using the stored foreground colour for each pixel; characterized in that:

the arrangement further comprises means for storing in a memory at least one set of background pixel data, each such set defining a background colour and depth for each pixel of the image; in that the means for selectively modifying the stored foreground data further comprises means for selectively modifying the stored background data in response to the input pixel data; and in that the means for forming the output pixel data comprises means for combining the stored foreground and background colours for each pixel in proportions defined by a mixing value associated with that pixel.

The mixing value for each pixel may be dependent on the fractional area of that pixel which falls within the representation of a given surface in the three-dimensional scene.

The input pixel data may include a mixing value for each input pixel of the series and at least the stored foreground pixel data may also include a mixing value for each pixel of the image.

The selective modifying means may be responsive to the input depth so that (with depth increasing away from a notional viewer of the scene):

(i) if the input depth is greater than the stored foreground and background depths, the stored foreground and background pixel data are left unchanged, (ii) if the input depth lies between the stored foreground depth and the stored background depth, the input pixel data is stored in place of the current background data for that pixel, and p1 (iii) if the input depth is less than both the stored foreground and background depths, the current foreground data for that pixel are stored in place of the current background data and the input data are stored in place of the current foreground data.

The selective modifying means may comprise a first digital comparator having a first input for receiving the input depth, a second input for receiving from a memory (RAM) the stored foreground depth and a logic output for indicating whether or not case (iii) above applies.

The selective modifying means may further comprise a multiplexer driven by the output of the first comparator for in case (ii) applying the input colour and depth to an input of the RAM and in case (iii) applying the stored foreground colour and depth, read via the output of the RAM, to the input of the RAM.

The output of the first comparator may be connected to a foreground write-enable input of the RAM to implement the storing of the new foreground colour, foreground depth (and mixing value if stored) when case (iii) applies.

The selective modifying means may further comprise a second digital comparator having a first input for receiving the input depth, a second input for receiving from the output of the RAM the stored background depth and a logic output for indicating whether or not case (i) applies. The output of the second comparator may be connected to a background write-enable input of the RAM to implement the storing of the new background colour and depth when case (ii) or case (iii) applies. Such features can conveniently be used as part of a hardware embodiment which operates synchronously at the output of scan conversion hardware.

The invention still further provides an electronic graphics system comprising an arrangement for generating two-dimensional images as set forth above, the system further comprising a memory for storing the foreground and background pixel data.

The system may further comprise input means for defining the scene to be represented and display means for displaying the image generated.

The memory may be arranged to allow access to both foreground and background pixel data in parallel. The memory (RAM) may comprise a foreground RAM for storing the foreground pixel data and depth (and the mixing value if stored), and at least one background RAM for storing the at least one set of background pixel data, the contents of the foreground and background RAMs being accessible in parallel for a given pixel. The RAM may comprise a separate RAM for each value stored for each pixel (colour, depth, mixing value etc.), All the values for an addressed pixel being accessible in parallel via respective data ports of the RAM. Such a configuration may allow faster operation by means of execution of several operations concurrently.

At least part of the RAM may comprise two or more identical RAMs connected via multiplexing means so that the means for forming the output pixel data is connected to one of said RAMs while the means for modifying the stored data is connected to a different one of said RAMs.

The means for forming the output pixel data may comprise a first multiplier for multiplying the stored foreground colour by a weighting fraction defined by the mixing value, a second multiplier for multiplying the at least one stored background colour by a complementary weighting fraction also defined by the mixing value and summing means for adding values at outputs of the first and second multipliers to generate an output colour value. The arrangement may comprise means for subtracting the weighting fraction from a predetermined constant to derive the complementary weighting fraction. Each multiplier may comprise a digital multiplier circuit.

It should be understood that if each colour is represented by a set of independent components, for example red, green and blue components, to "multiply a colour value" by an associated weighting fraction as described herein involves multiplication of each component value individually by the weighting fraction.

Embodiments of the invention will now be described, by way of example, with reference to the accompanying drawings, in which:

FIG. 9 shows yet another part of the arrangement of FIG. 6 in more detail.

Figure 1:
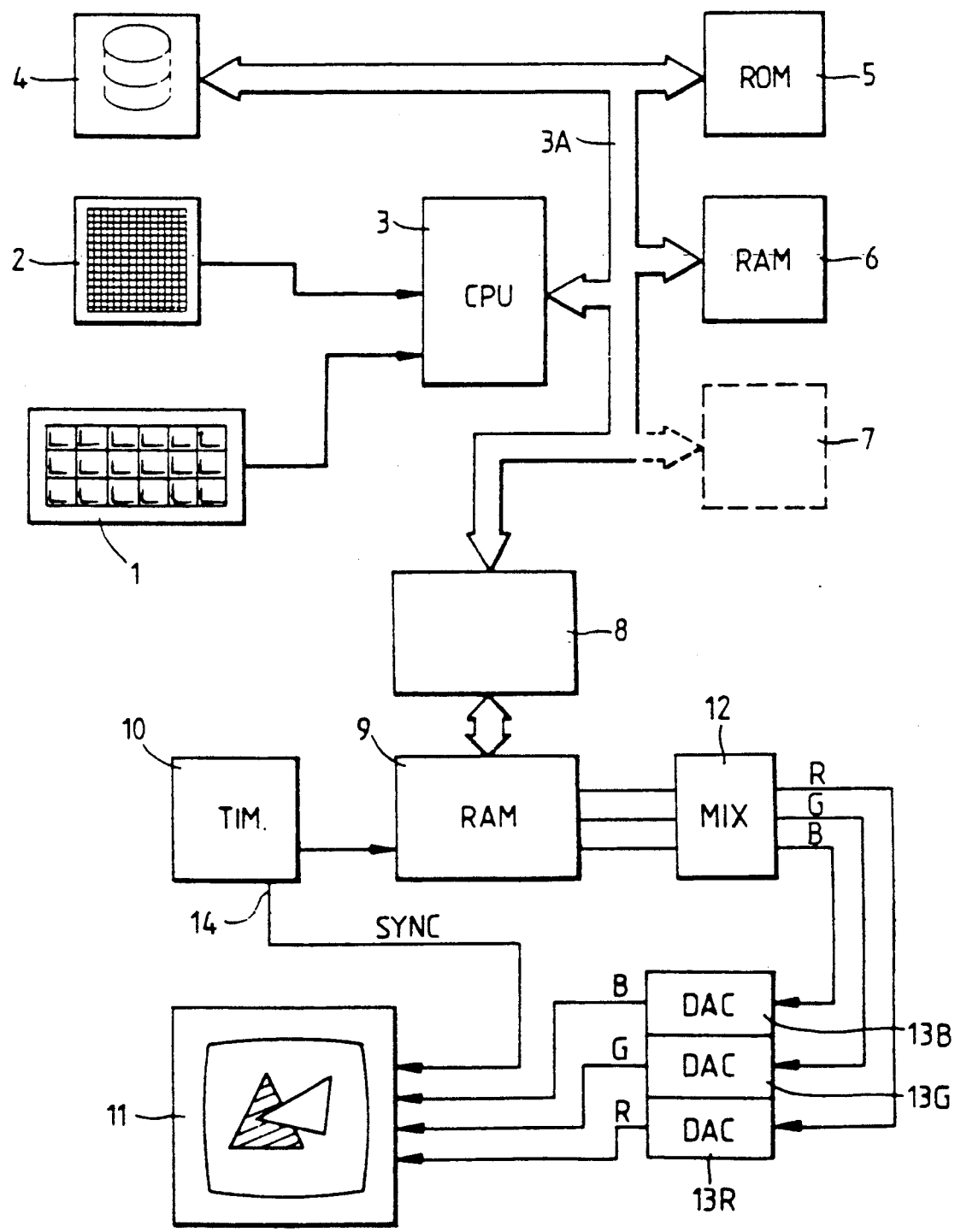
FIG. 1 is a schematic block diagram of an electronic graphics system in accordance with the present invention.

FIG. 1 is a block diagram of a graphics system in accordance with the present invention. A keyboard 1 and graphic digitizer tablet 2 provide input from a user to a central processing unit (CPU) 3. The graphic tablet may be used for 'drawing' input images to be manipulated by the system, in a known manner. Other input devices may also be used, of course, such as a joystick, trackerball or a 'mouse'. Such devices may also be used to manipulate images created by rotating, zooming etc.. In general, such devices are more convenient to use than a conventional keyboard alone.

The CPU 3 is also connected via a bus 3A (for example a VME bus) to a disc store 4, a ROM 5 and a RAM 6. The disc store, which may include magnetic floppy discs, hard discs, and/or optical memory discs, is used for storing data (for example complete or part images, or sequences of images) which can then be recalled and manipulated to generate new images as desired. Such data may include the user's work from previous input sessions, but it may also include commercially generated data, for example images for use in interactive computer-aided design or computer simulations. To allow modeling of three dimensional objects, such data will generally be stored as polygonal model data rather than in the form of two-dimensional images. In that case, the data corresponds to a three-dimensional model containing objects which are typically broken down into groups of polygonal surfaces in a three-dimensional co-ordinate space (triangular or quadrilateral surfaces for example). The data for each object in the model comprises a list giving the position and nature of every polygon that goes to make up the object, including the relative positions of its vertices and the colour, 'texture' and/or transparency of the polygon surface.

Other representations of the 3-D model are known in the art, and may equally well be used. For example the surfaces and their boundaries may be defined as curved surfaces by means of non-linear equations. This allows greater realism in the image, avoiding the need to break curved surfaces into many discrete flat surfaces, but is generally very demanding of processing power.

The CPU 3 and the other components of the system then translate this three-dimensional model 'world' into a two-dimensional view for the user, from whatever viewpoint the user chooses.

The ROM 5 and RAM 6 provide programme memory and workspace for the CPU 3, which may comprise a microprocessor, such as a Motorola MC68020. Special processing hardware 7 may be provided to assist the CPU 3 to perform the large number of arithmetic operations required to convert all but the simplest models into a two-dimensional scene. The operations required of a typical system will be described hereinafter, with reference to FIG. 2. The hardware 7 may comprise TTL arithmetic circuits, or alternatively custom-built or programmable digital signal processing (DSP) integrated circuits, connected to the CPU 3 for example via a VME bus connection. The nature of the hardware 7 (if required at all) will depend on the requirements of the system, for example with respect to speed, resolution, number of polygons per scene, etc.

Drawing hardware 8 is connected between outputs of the CPU 3 and inputs of a display RAM 9. The RAM 9 stores pixel data in raster-scan format, and the data includes two colour values and a mixing value for each pixel. Each colour value stored could typically comprise three 8-bit components (total 24 bits) corresponding to red (R) green (G) and blue (B) components of the desired image, but in other embodiments, the 24 bits might define the same colour encoded as HSV (hue, saturation, luminance) values, which simplifies calculations of lighting effects as is known in the art. Fewer or more bits can be used, to reduce memory requirements or improve colour resolution respectively. Other colour coding systems such as YUV or YIQ (luminance plus two colour-difference components) could also be used if desired. For monochrome images, of course, a single grey-scale value of say 8 bits would be all that is required.

While the method of setting-up and modifying the data stored in the RAM 9 in accordance with the invention can be performed under software control, drawing hardware 8 provides a hardware embodiment which is dedicated to generating addresses and colour, depth and mixing values for large numbers of pixels, enabling a higher 'pixel writing rate' to be achieved. The hardware 8 includes apparatus for performing anti-aliasing and hidden surface removal (HSR) on each pixel generated in accordance with the present invention, as described hereinafter.

A timing unit 10 generates signals to co-ordinate the calculation of output colour values from the pixel data stored within the RAM 9, and their transfer to a display screen 11. In response to these signals, the locations in the RAM 9 are scanned row by row and column by column and the values read are converted to the output colour values by a mixing arrangement 12. A colour look-up table (CLUT) (not shown) may be required if RGB values are not stored. If the colour code is a linear code such as YUV, for example, a CLUT could translate the 24-bit colour signal at the output of the mixer 12 into the equivalent three 8-bit RGB signals, which are then fed to three 8-bit digital to analogue converters (DACs) 13R,13G,13B. If a non-linear code is used, such as HSV, where the hue (H) and saturation (S) components are non-linear in terms of R, G and B, then the translation to RGB must be performed on each of the foreground and background colour values before mixing, for example at the output of the RAM 9, unless a suitable non-linear mixing arrangement is provided.

The analogue outputs of the DACs drive the cathode-ray tube (CRT) display screen 11 which, directly or indirectly, receives timing signals (SYNC) from an output 14 of the timing unit 10, so that the CRT beams scan the screen line by line, pixel by pixel, in step with the scanning of the RAM 9. In other embodiments, according to display requirements, the CRT display could be replaced by a different type of display device, for example a liquid crystal display (LCD) or a projection-type display.

Figure 2:
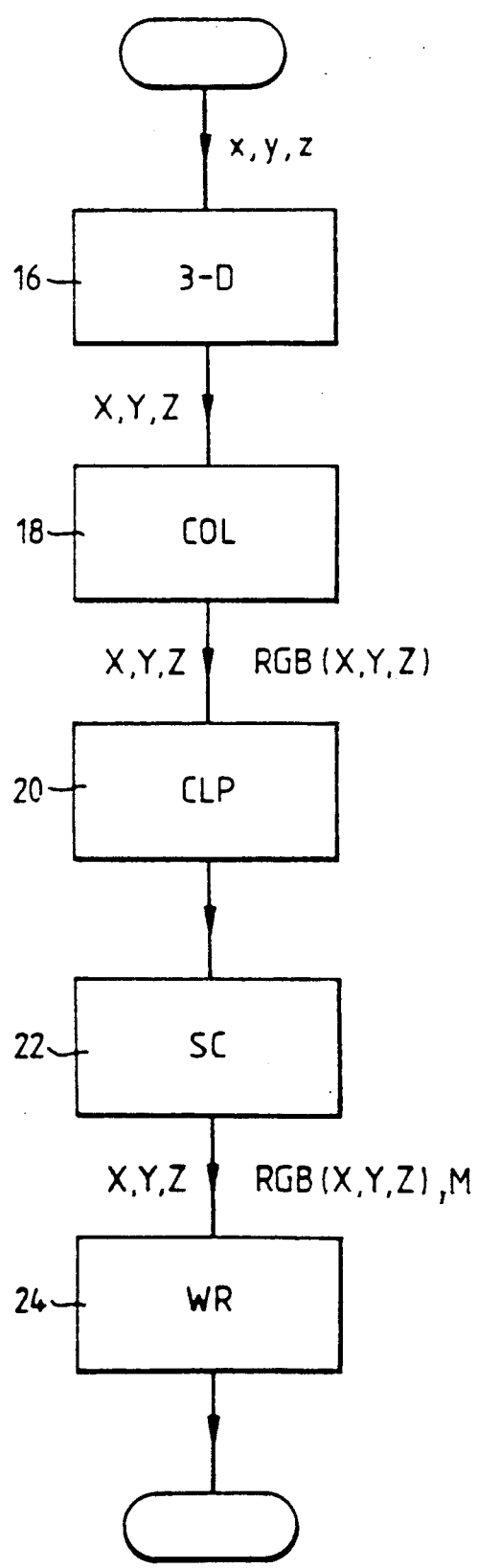
FIG. 2 is a flow chart illustrating a method of generating a two-dimensional image in an electronic graphics system.

FIG. 2 is a flow diagram showing the process steps required to produce a frame of pixels from data input in the form of polygonal model data. That is, the scene to be depicted is described as a series of polygons, each stored as a list of coordinates (x,y,z) for each of its vertices, together with information on the colour and other attributes of the surface defined by the vertices. In block 16 (3-D), three-dimensional geometric translations are performed on all the coordinates (x,y,z) of the models to determine their positions (X,Y) on the two-dimensional screen and their depth Z 'into' the screen. The transformations will typically involve translation, rotation and perspective. For simplicity, it is assumed for the purposes of this description that Z equals zero in the extreme foreground and increases into the distance. This is the convention usually adopted in the art, but of course the invention is readily adaptable to allow for different systems of representing the depth co-ordinate. For example, in practical embodiments, it is often preferable to store the reciprocal of Z, as this simplifies perspective calculations.

Next, in block 18 (COL), lighting values are used to vary the shading of each polygon, for example, in accordance with a predetermined lighting direction. In block 20 (CLP), polygons which are transformed to positions (X,Y) wholly or partially outside the screen boundary are 'clipped' to the screen boundary to avoid wasting time processing redundant information.

In block 22 (SC), the polygons are 'scan converted' so that they may be drawn (block 24 (WR)) into the display memory. Scan conversion is a process whereby the pixels covered by each polygon are written row by row and pixel by pixel, in the same way that the complete image will be scanned for output to the display. In the present embodiment, a mixing value M is assigned to each pixel during the scan-conversion for the purposes of antialiasing. For pixels within the body of a polygon, this value represents unity or 100 percent coverage, but for pixels at the edge of the polygon it reduces in proportion to the fraction of the area of the pixel (X,Y) which falls within the polygon boundary. The number of bits (resolution) used for the mixing value need not be any higher than the intensity resolution of the final display, for example 8 bits, but in many cases even four bits will suffice. The colour values and the mixing value can then be read row by row from the video RAM at the display pixel rate, fed via the mixing arrangement 12 to the digital to analogue converters and converted into video signals for display on the CRT screen.

The scan-conversion may be performed for the whole array at once, or be broken down according to a scan-line algorithm, as is well known in principle. In such a case, all the polygons would be sorted to identify which fall under each scan line (each Y), and then scan conversion, HSR and antialiasing would be performed one line at a time. Such a technique may save a lot of memory if the mixing of the foreground and background colour values can be performed in a small line-buffer RAM, before storage in the display RAM, because then the display RAM need store only one colour value for each pixel of the large array.

Some or all of the blocks 16 to 24 may be implemented under software control by a computer, but for high speed operation even a fast microprocessor will require assistance from specialized hardware. The scan conversion, for example, is in this embodiment implemented in the drawing hardware 8 to obtain sufficient speed for the display of real-time or near real-time moving images (i.e. several frames per second). This is particularly necessary as the scan conversion block 22 (SC) also includes processing to perform shading of objects to account for complex lighting information, as well as to perform antialiasing and hidden surface removal (HSR).

Figure 3:
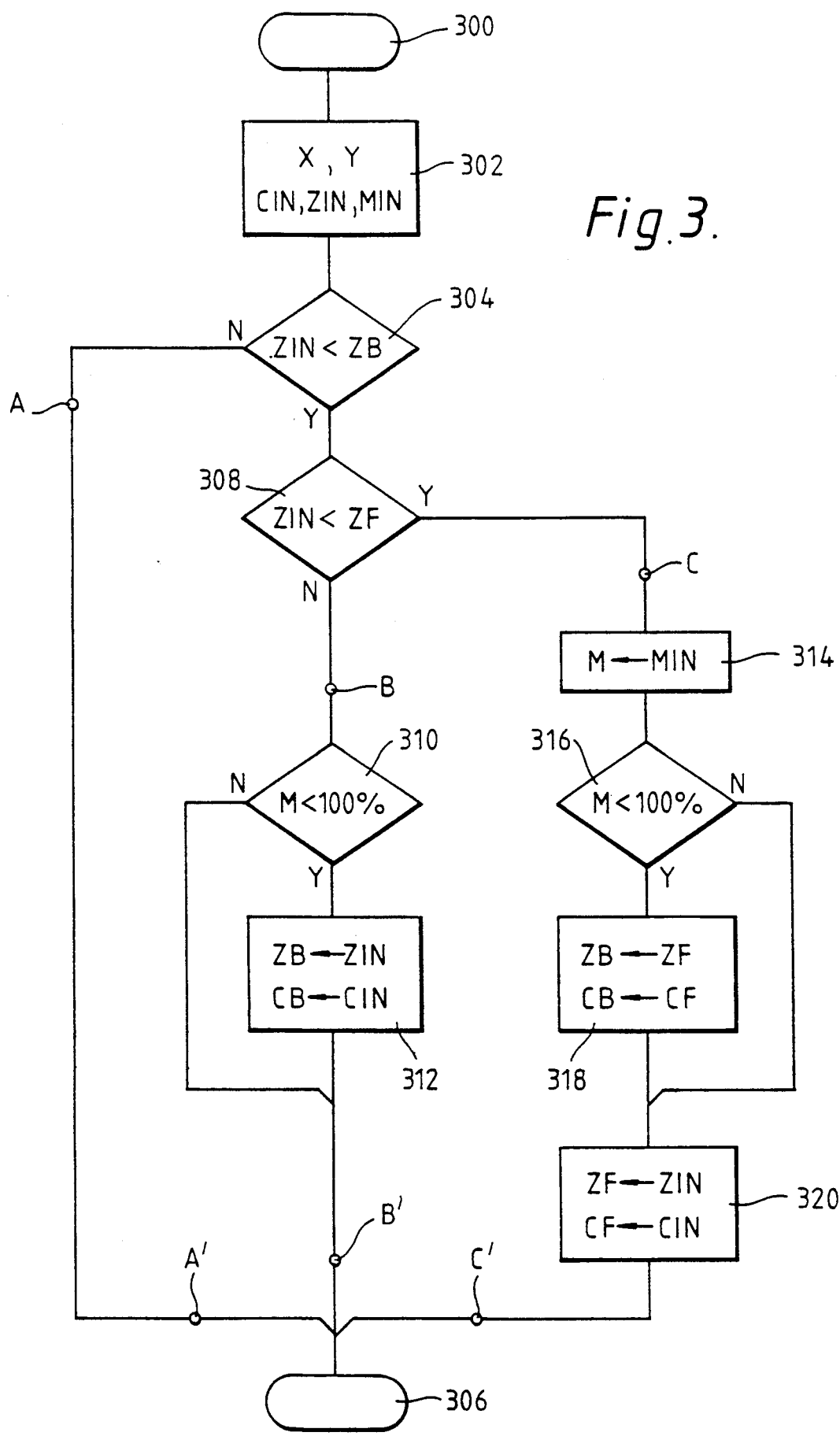
FIG. 3 is a flow chart illustrating a first part of a method of generating a two-dimensional image in accordance with the invention.

FIG. 3 illustrates a first part of a method of generating a two dimensional image in accordance with the present invention.

The method starts at step 300, and in step 302 the address (X,Y) of an input pixel is established and also an input colour value CIN, depth value ZIN and mixing value MIN. Mixing value MIN defines a weighting fraction for the input colour value CIN, and for the present purpose it will be assumed that MIN represents the weighting fraction directly on a scale of 0 to 100 percent.

It is assumed that the RAM already contains data for each pixel (X,Y) comprising a foreground colour value CF, a background colour value CB, a mixing value M defining a weighting fraction for CF (and implicitly defining a complementary weighting fraction for CB), a foreground depth value ZF and a background depth value ZB. These stored values may be set up to represent a blank starting image or may be the result of previous iterations of the method of FIG. 3.

In step 304 the input depth value ZIN is compared with the stored background depth value ZB for pixel (X,Y), read from the RAM. If ZIN is not less than ZB, the section between the points marked A and A' on the flow chart is executed, which in this case does not modify the stored data at all, and the method terminates at step 306. If the comparison step 304 determines that ZIN is less than ZB, then a further comparison, this time between ZIN and the stored foreground depth value ZF for the pixel (X,Y), is preferred in step 308.

If the comparison 308 reveals that ZIN is not less than ZF, then the section between the points marked B and B' on the flow chart is performed before the method terminates at block 306. The section BB' includes step 310 which tests the mixing value M which in this embodiment is the same as the weighting fraction for the foreground colour CF of the pixel (X,Y) stored in the RAM. If M is less than 100 percent, step 312 is performed to store the input values ZIN and CIN in the RAM as new background depth and colour values, ZB and CB respectively, for the pixel (X,Y). If M is 100 percent, then the step 312 is not performed. In either case the section BB' then finishes at B' and the method terminates at step 306 as before.

If the comparison 308 reveals that ZIN is less than ZF then the section between points C and C' is performed whereby in step 314 the input mixing value MIN is written into the RAM as a new stored mixing value M and then is tested in step 316 to determine whether M (MIN that was) is less than 100 percent. If M is less than 100 percent then step 318 is performed which transfers the foreground values ZF and CF within the RAM to become new background values ZB and CB respectively. Step 320 then writes the input into the RAM to become new foreground values ZF and CF respectively, after which the procedure CC' is complete and the method terminates at step 306. If in step 316 M is found to be 100 percent then the step 318 is omitted and the method proceeds directly to step 320 and via point C' to terminate at step 306 as in the other cases.

The purpose of the comparison steps 304 and 308 is to decide whether the input pixel lies behind both the stored foreground and background pixels (ZIN>ZB>ZF) and is therefore invisible, lies between the two stored pixels (ZB>ZIN>ZF)and may therefore be partially visible or lies in front of both the foreground the background (ZB>ZF>ZIN) therefore constitutes a new foreground pixel. These cases will be recognized as corresponding approximately to the cases (i), (ii) and (iii) respectively, as identified in the introduction, but include provision for the two "borderline" cases ZIN=ZB (which is treated as part of case (i)) and ZIN=ZF (treated as part of case (ii)). These borderline cases occur with very low probability and how to treat them is substantially an arbitrary decision. The decision represented by FIG. 3 saves times in a serially-executed embodiment by choosing the quickest option in borderline cases, but as these cases are so rare the saving is likely to be negligible. A more sophisticated method of deciding which case to apply will be described hereinafter with reference to FIG. 4.

From the foregoing, it will further be recognized that the sections AA', BB' and CC' of the flow chart of FIG. 3 represent embodiments of the procedures performed in cases (i), (ii) and (iii) respectively of a method such as those described in the introduction. It should also be appreciated, however, that these sections do not represent the only possible embodiments of those procedures, just as the method described for choosing which section to perform (i.e. whether case (i), (ii) or (iii) applies) is not the only possible embodiment of that part of the invention. The choice of any particular embodiment will depend on many factors familiar to those skilled in the art, such as whether the method is to be performed entirely serially or with some operations performed in parallel; whether it is performed under software control by a computer, or by dedicated hardware.

The tests performed in blocks 310 and 316 may save time in a serially-executed embodiment by by-passing the blocks 312 and 318 in cases where M=100 percent, that is to say for pixels where the foreground pixel colour will completely obscure the background pixel colour when the image is finally displayed. For such pixels, which make up the vast majority of all pixels (the remainder being only those at the edges of drawn shapes) time may be saved by not writing new background values ZB and CB when these will have no effect on the image generated.

In contrast, for a parallel-executed embodiment such as that performed by the hardware embodiments to be described hereinafter, the introduction of testing step 314 may actually waste time: if M, ZF and CF have to be written anyway and ZB and CB could be written in parallel with them with no time penalty, then ZB and CB may as well be written, even if they are irrelevant, rather than introduce a delay while the step 314 is executed. Thus the section CC' becomes merely the simultaneous execution of steps 314, 318 and 320. Similarly, if the timing of operations is such that time has to be allowed for a writing step even though one may not be required, so that sections AA', BB' and CC' all take an equal time to execute, there is no point in performing the test step 310: the section BB' may comprise step 312 alone with no loss of speed. Further, if both tests 310 and 316 are omitted, there is no need to read the value M from the RAM, which may save hardware as well as time.

Figure 4:
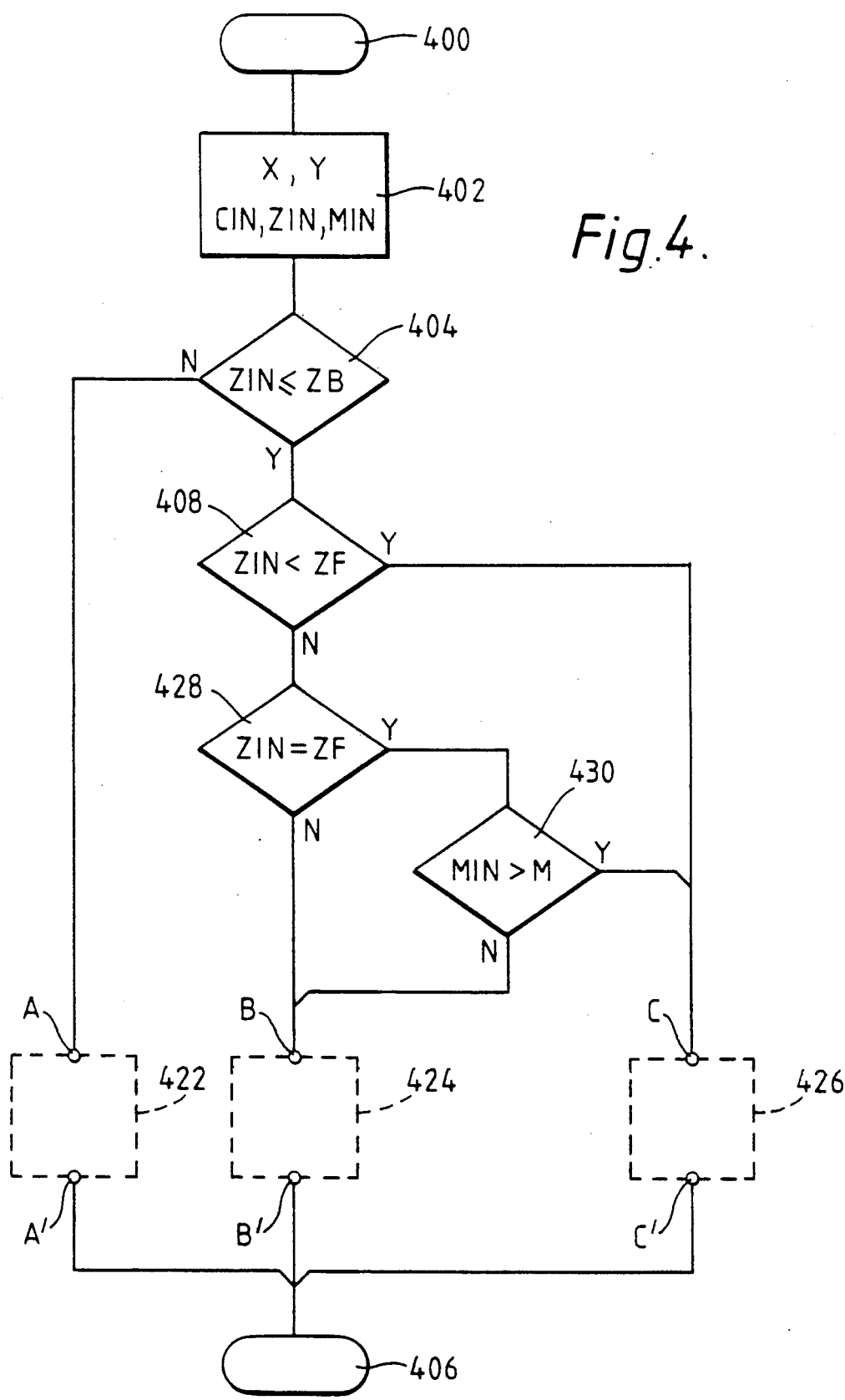
FIG. 4 is a flow chart illustrating an alternative embodiment of part of the method of FIG. 3.

FIG. 4 represents an alternative method for determining which procedure should be performed, specifically in the borderline case ZIN=ZF. In this flow chart, steps 400, 402, 404, 406 and 408 correspond to the steps 300 to 308 in FIG. 3, already described. For compactness, dotted boxes 422, 424 and 426 represent the same sections AA', BB' and CC' as are shown in full in FIG. 3. Alternative embodiments of procedures to be performed in cases (i), (ii) and (iii), such as those described hereinbefore may, of course be substituted for the sections AA', BB' and CC' as desired.

The difference between the method illustrated in FIG. 4 and that in FIG. 3 is that if the comparison step 408 finds that ZIN is not less than ZF, a further comparison is performed (step 428) to distinguish the borderline case ZIN=ZF from the more likely case ZIN>ZF. If the latter is found to apply, then section BB' (box 424) is performed as before. If, however, the borderline case applies (ZIN=ZF), then the method does not opt to perform either one of sections BB' or CC' arbitrarily, but instead compares (step 430) the input mixing value (weighting fraction) MIN with the stored mixing value M. If MIN is greater than M, then the section CC' is performed, but if MIN is less than M, the section BB' is performed.

The weighting fraction is thus used as a measure of the relative importance of the input pixel against the present foreground pixel, to determine whether it should become a new foreground pixel, or just a new background pixel. Neither option offers a perfect solution, but if the less transparent colour, i.e. that with the higher weighting fraction, were not made into the new foreground colour, then it would be noticeable by its relative weakness in the overall scene.

Figure 5:
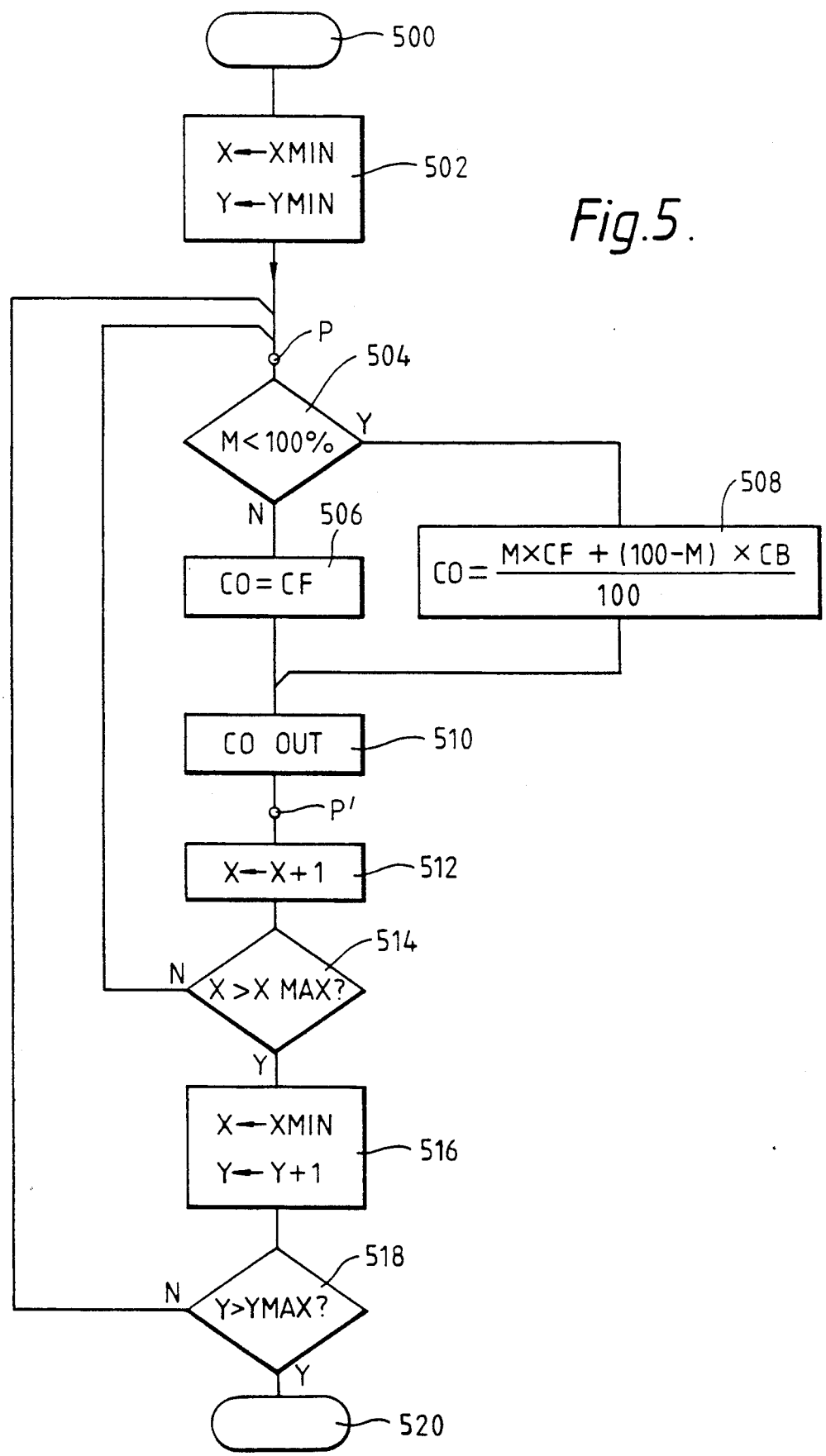
FIG. 5 is a flow chart illustrating a second part of a method of generating a two-dimensional image in accordance with the present invention.

FIG. 5 represents a method of generating the output colour values CO for each pixel (X,Y) of an array of pixels which have been stored in the RAM by a method such as those described with reference to FIGS. 3 and 4. The value of X runs from XMIN at one side of the array to XMAX at the other, and the value of Y runs from YMIN at the top (or bottom) of the array to YMAX at the bottom (or top) The values XMIN, YMIN, XMAX and YMAX will typically correspond to the boundaries of the final display.

The method starts at step 500, and then in step 502 a current pixel address (X,Y) is set to equal (XMIN, YMIN), representing the top left hand pixel of the final image, for example. Next, in step 504, the stored weighting fraction for the foreground colour CF is read from the RAM and if M=100 percent then step 506 is performed, to define the output colour CO for the pixel X,Y to be equal to the foreground colour CF, read from the RAM. If M is less than 100 percent, step 508 is performed which defines CO to be an average of the stored foreground value CF and the stored background value CB, weighting according to the fraction M. If M is stored as a percentage, the formula for CO is:

$$CO=[M\times CF+(100-M)\times CB]/100$$

From either step 506 or step 508 the method proceeds to step 510, where the colour CO is either fed directly to the display device or is stored in a display RAM for subsequent display in a conventional manner. If direct output to the display is implemented, the performance of the method of FIG. 5 may require dedicated hardware, such as that described hereafter with reference to FIGS. 6, 7 and 9, to achieve a sufficient pixel rate. Further, in the hardware embodiment to be described hereinafter, calculation of CO is performed according to step 508 for every pixel and steps 504 and 506 are omitted, because the alternative path would not save time and the time taken to test M (step 504) would be wasted. The beginning of the section of the flow chart comprising steps 504, 506, 508, 510 is marked P and the end of that section is marked P'.

After executing the section PP' step 512 is performed to increment X so that the next pixel is addressed. In step 514 X is compared with XMAX to see if a row of pixels (row Y) has been completed that is if X now exceeds XMAX. If not, execution returns to point P to calculate CO for the new pixel. If a row has been completed then X is reset to XMIN and Y is incremented (step 516) to address the first pixel in the next row. Y is then compared with YMAX (step 518) and if all the rows from YMIN to YMAX have been processed, that is if Y now exceeds YMAX, the method terminates at step 520. If not, execution returns to point P to begin calculation of CO for the new row of pixels.

Figure 6:
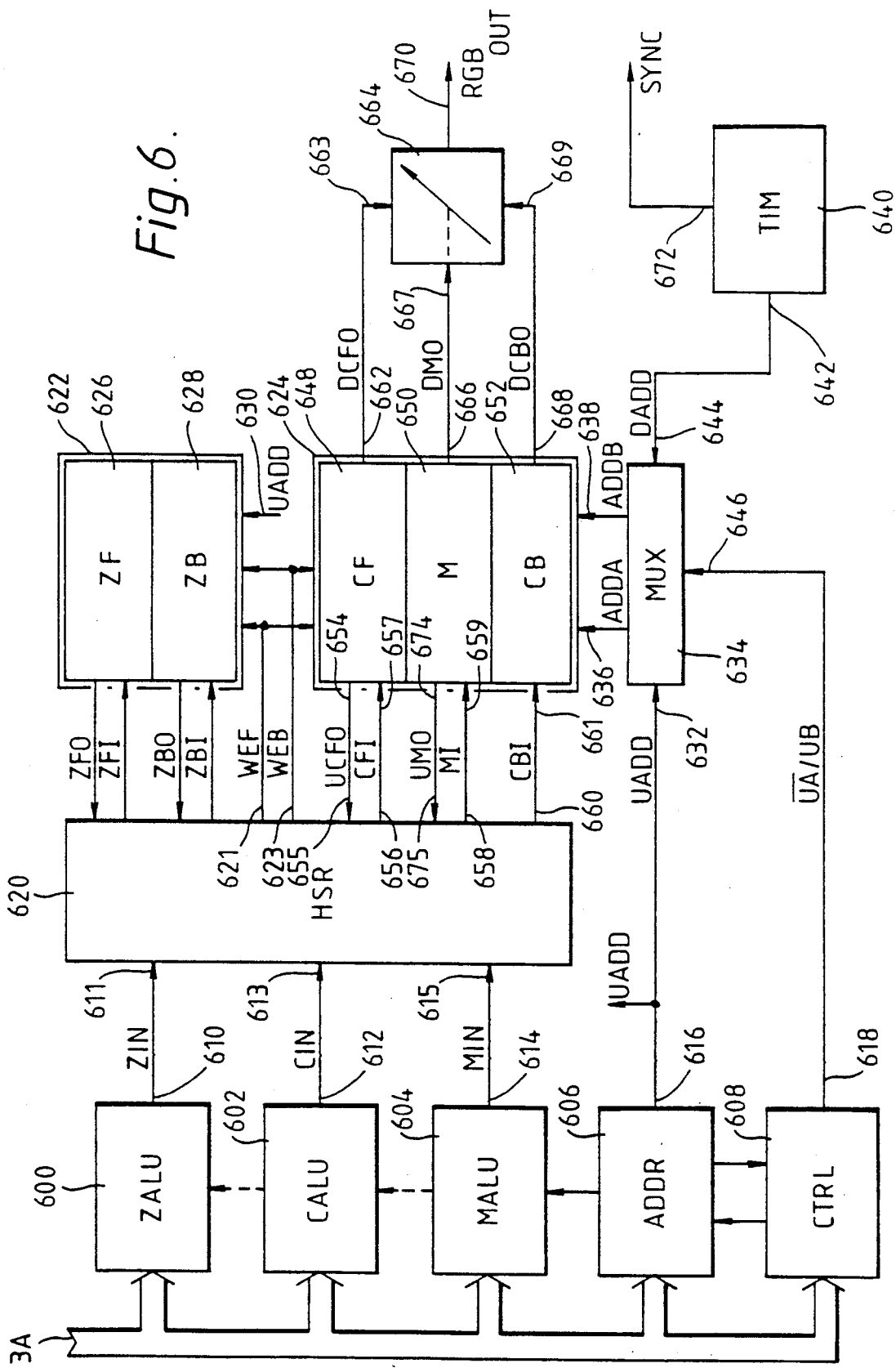
FIG. 6 is a block schematic diagram of part of an arrangement for generating two-dimensional images in accordance with the present invention.

FIG. 6 is a block schematic diagram of part of an arrangement for generating two dimensional images in accordance with the present invention and comprises an embodiment of the drawing hardware 8 and display RAM 9 of the system of FIG. 1. The CPU 3 (not shown in FIG. 6) is connected via the bus 3A to arithmetic and logic units (ALUs) 600, 602 and 604 for calculating depth values, colour values and mixing values respectively for a series of pixels. The bus is also connected to an address ALU 606 and a sequencer or control circuit 608. The ALUs 600-606 may be simple latches for receiving values already calculated by the CPU 3, but in other embodiments they contain counters and incrementers for generating whole series of pixels under control of the sequencer 608, after one set of parameters defining the series have been supplied by the CPU 3 via the bus 3A. The construction of such ALUs is a matter of design, for example dedicated ALU chips such as Logic Devices Incorporated's 16-bit ALU L4C381 may be used in the drawing hardware as is well known in the art.

The depth ALU 600 has an output 610 for supplying input depth data ZIN to an input 611 of a hidden surface removal (HSR) control circuit 620. Similarly the colour ALU 602 has an output 612 connected to an input 613 of the HSR circuit 620 for supplying input colour data CIN and the mixing value ALU 604 has an output 614 connected to an input 615 of the HSR circuit 620 for supplying input mixing data MIN. The number of bits used for each type of data depends of course on the resolution required, but for example depth values may be 24 bits wide, colour values may be 24 bits wide (i.e. three 8-bit components) and mixing values may be just 4 bits wide.

The HSR circuit 620 is connected via several outputs to several data ports of a RAM which, in this embodiment comprises separately a depth RAM 622 and a double-buffered display RAM 624. The depth RAM, 622 is divided into foreground and background depth RAMs 626 and 628 respectively, each having an output data port and an input data port connected to the HSR circuit 620 for supplying stored foreground and background depth data ZFO and ZBO, respectively and for receiving new depth data ZFI, ZBI for storing in the foreground and background depth RAMs 622 and 624 respectively.

The address ALU 606 has an output 616 which is connected to an address input 630 of the depth RAM 622 for supplying an address UADD of each pixel location to be modified. It will be appreciated by those skilled in the art that where an address signal is supplied to a RAM circuit, typically constructed out of semiconductor memory integrated circuits, control signals must also be supplied to enable the RAM to latch the addresses and access the appropriate memory cells. It should hereby be understood that the provision of these address strobe signals, and any other enabling signals is implicit in the provision of the address signals. Control signals therefore accompany the address UADD and are generated by the sequencer 608 or the address ALU 606 as required. However, write-enable signals WEF and WEB are generated by the HSR circuit 620 at outputs 621 and 623 respectively, to determine which of the values addressed in the RAM, 622, 624 are to be modified, as explained hereinafter.

The output 616 (UADD) of the address ALU 606 is also connected to a first input 632 of an address multiplexer 634 which has two address outputs (ADDA and ADDB) connected to first and second address inputs 636 and 638 of the display RAM 624. A display timing circuit 640 has an output 642 connected to a second input 644 of the address multiplexer 634 for supplying the address DADD of pixels which are currently being displayed. The sequencer 608 has an output 618 ($\overline{UA}/UB$) which is connected to a control input 646 of the multiplexer 634 for controlling the double-buffering action of the display RAM 624, as described hereafter.

The display RAM 624 comprises three separate RAMs 648, 650 and 652 for storing foreground colour values, mixing values and background colour values respectively. The foreground colour RAM 648 has an output 654 for supplying stored colour data UCFO, addressed by the address UADD, to an input 655 of the HSR circuit 620 which in turn supplies new colour data CFI via its output 656 to an input 657 of the RAM 648. The mixing value RAM 650 has an output 674 for supplying stored mixing value data UMO to an input 675 of the HSR circuit 620. The HSR circuit 620 in turn has an output 658 for supplying new mixing value data MI to an input 659 of the mixing value RAM 650, and an output 660 for supplying new background colour data CBI to an input 661 of the background colour RAM 652.

The RAM 648 also has an output 662 for supplying colour data DCFO addressed by display address DADD to a first input 663 of a mixer circuit 664, while mixing value RAM 650 similarly has an output 666 (DMO) connected to a second input 667 of mixer 664 and background colour RAM 652 has an output 668 (DCBO) connected to a third input 669 of the mixer 664. The mixer 664 has an output 670 which forms an output of the circuit of FIG. 6 for carrying output colour signals $RGB_{OUT}$, and the display timing circuit 640 has an output 672 which forms another output of the circuit for carrying display synchronizing signals SYNC. The circuit 640 is thus analogous to the timing circuit 10 of FIG. 1.

Figure 7:
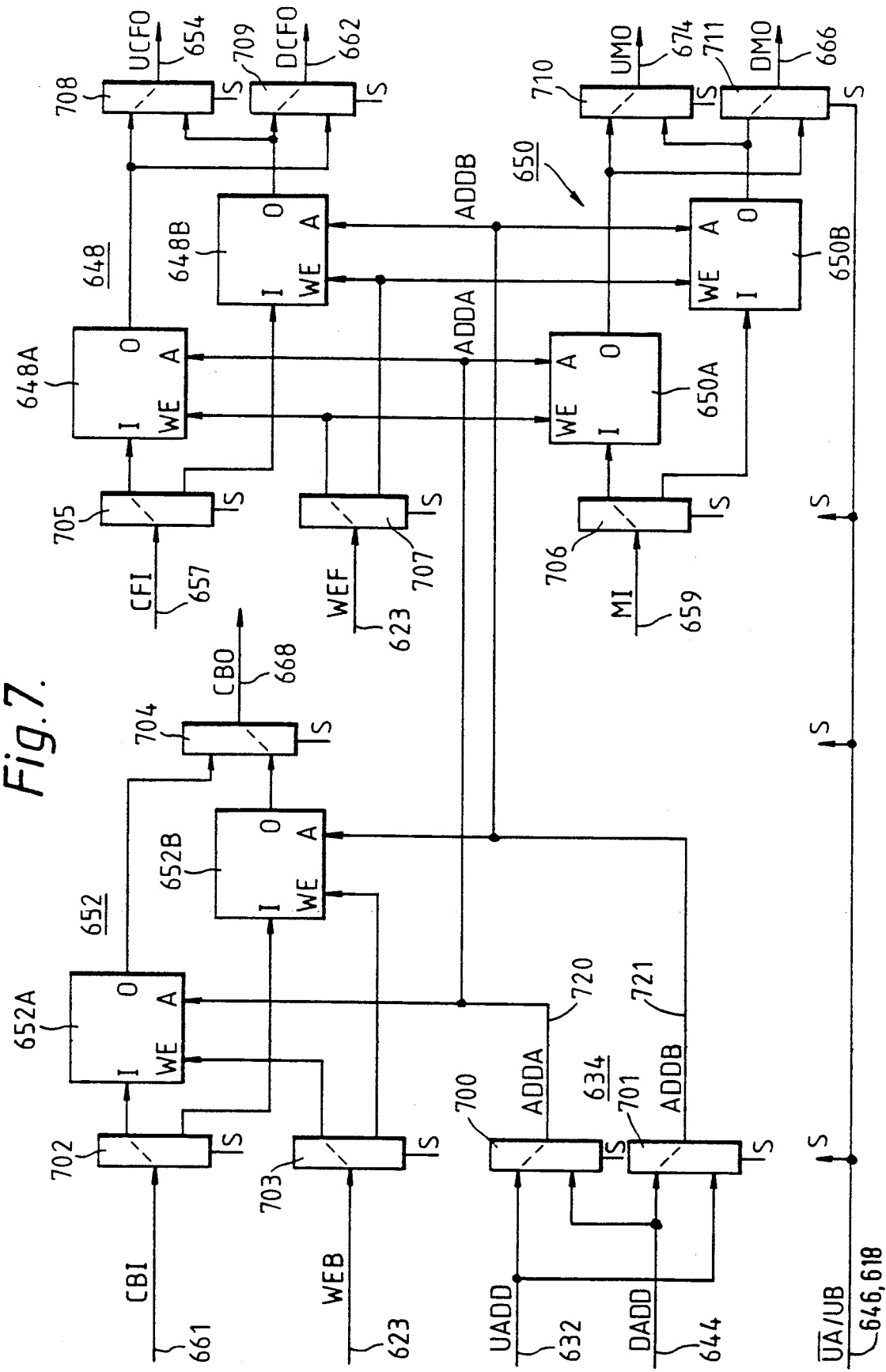
FIG. 7 shows part of the arrangement of FIG. 6 in more detail.

FIG. 7 shows the display RAM 624 and the multiplexer 634 in more detail. The display RAM (648/650/652) in fact comprises two identical display RAMs 648A/650A/652A and 648B/650B/652B, providing sufficient capacity to store two complete images. In operation, a complete image is held for display in one bank (for example the 'B' bank) while the next image is being built up in the other bank (the 'A' bank). When the image in bank 'A' is complete, the banks are swapped so that the new image is displayed and a further image can be built up in bank B. This technique is known as 'double-buffering' and avoids conflict between the writing of data into the RAM 624 under control of the ALU's 600 to 606 and the reading of data from the RAM 624 under the control of the timing circuit 640.

Double-buffering is particularly useful if some images take longer than one frame period to build up in the RAM. In a single-buffered system, this would lead to disturbing effects on the display as the screen is first cleared to a background colour, and then various objects appear and disappear as the image is built up. Double-buffering allows a clean, instantaneous change from one scene to the next, allowing reasonable continuity to be achieved, for example to perform animation, even though the picture is updated only a few times per second. The invention is of course compatible with either a double-buffered system or a single-buffered system.

It will be apparent to those skilled in the art that the depth RAM 622 need not be doubled-buffered. This is because the depth values it contains do not need to be scanned to produce the two-dimensional display—they are used only to determine the final contents of the display RAM 624 before display in each frame.

To implement the double-buffering, the circuit of FIG. 7 includes twelve multiplexers 700–711, each of which has a control input (S) connected to the input 646 for receiving the signal S=$\overline{UA}$/UB the output 618 of the sequencer 608 of FIG. 6. The first two multiplexers 700 and 701 form the address multiplexer 634 of FIG. 6, each having a first input connected via input 632 (UADD) to the address ALU 606 and a second input connected via input 644 (DADD) to the display timer 640. Multiplexer 700 has an output 720 (ADDA) connected to address inputs (A) of the 'A' bank, 648A/650A/652A of the display RAM, while multiplexer 701 has an output 721 (ADDB) connected to address inputs (A) of the 'B' bank 648B/650B/652B of the display RAM. Dashed lines within each multiplexer 700–711 indicate the path of data through that multiplexer when the control signal S is low (logic '0'). The alternative data path applies when S is high (logic '1'). Thus, when S=$\overline{UA}$/UB is low the 'A' RAMs receive the address UADD (ADDA=UADD) and the 'B' RAMs receive the address DADD (ADDB=DADD), and when S=$\overline{UA}$/UB is high the 'A' RAMs receive ADDA=-DADD and the 'B' RAMs receive ADDB=UADD.

Each RAM also has a data input port (I), a data output port (0) and a write-enable input (WE), which are all connected to the rest of the arrangement of FIG. 6 via multiplexers, so that the paths of the control and data signals for updating and reading the display RAM contents are all swapped from 'A' to 'B' and vice versa synchronously with the appropriate address signals. Multiplexer 702 connects input 661 (CBI) to the input port of the background colour RAM 652A if S=0 and to that of RAM 652B if S=1. Multiplexer 703 connects the background write enable signal WEB at output 623 of the HSR circuit 620 (FIG. 6) of the WE input of RAM 652A (S=0) or RAM 652B (S=1). Multiplexer 704 connects the data output of either RAM 652B (S=0) or RAM 652A (S=1) to the output 668 (CBO). Similarly, by means of multiplexers 705 to 711: input 657 (CFI), which is derived from output 656 of the HSR circuit 620, is connected to the data input of RAM 648A (S=0) or 648B (S=1); input 659 (MI) which is derived from output 658 of the HSR circuit 620, is connected to the data input of RAM 650A (S=0) or 650B (S=1); the foreground write-enable output 623 (WEF) of the HSR circuit 620 is connected to the WE inputs of RAMs 648A and 650A (S=0) or RAMs 648B and 650B (S=1); the data output of either RAM 648A (S=0) or RAM 648B (S=1) is connected to output 654 (UCFO); the data output of either RAM 648B (S=0) or RAM 648A (S=1) is connected to output 662 (DCFO); the data output of either RAM 650A (S=0) or RAM 650B (S=1) is connected to the output 674 (UMO); and the data output of either RAM, 650B (S=0) or 650A (S=1) is connected to output 666 (DMO).

To summarize, the inputs signals CBI, WEB, CFI, MI and WEF and the output signals UCFO and UMO are associated with the address signal UADD and are thus used for building up a new image in the RAM, whereas output signals CBO, DCFO and DMO are associated with the address signal DADD and are thus used for displaying an image previously built-up in the RAM.

Figure 8:
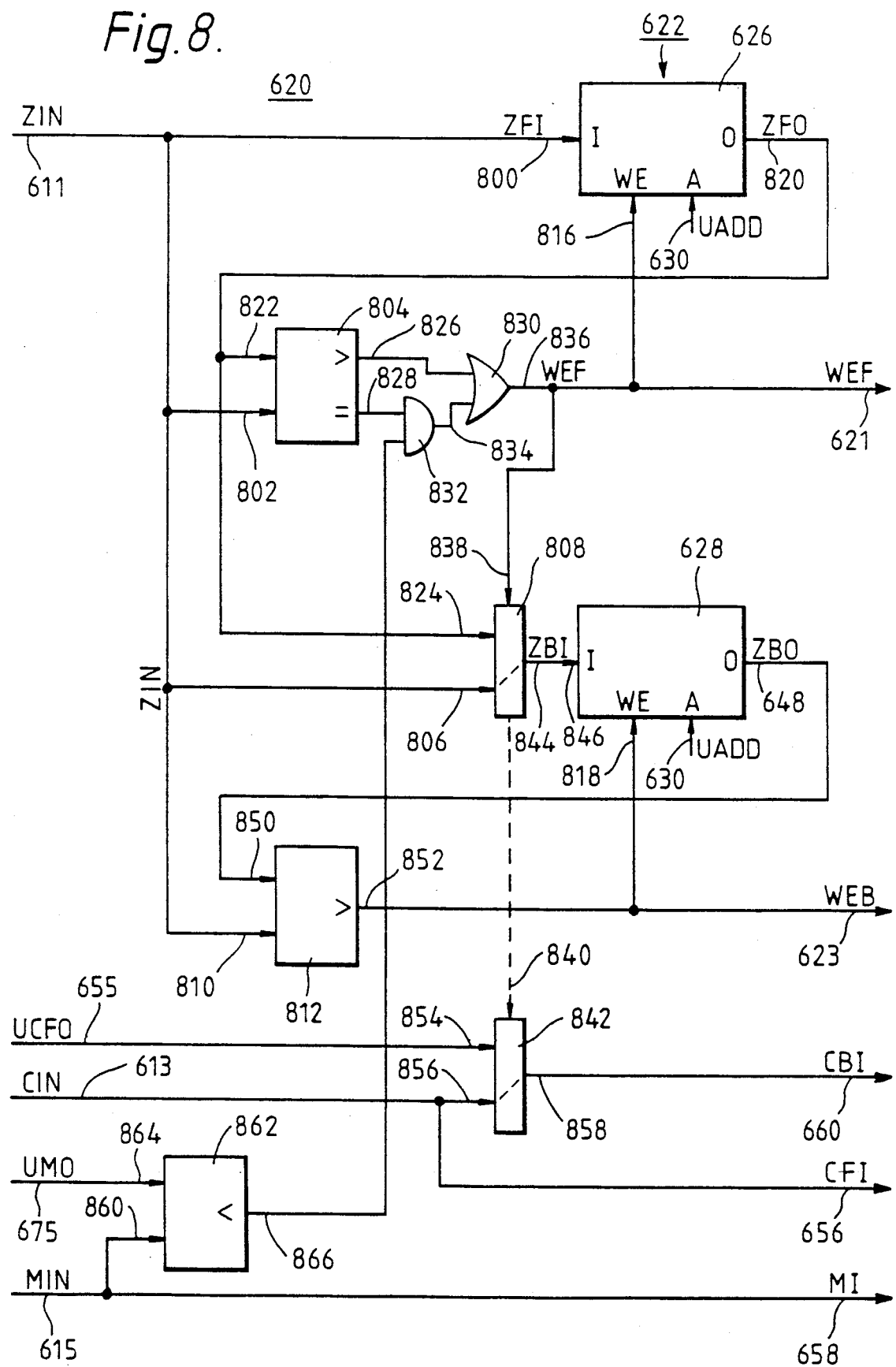
FIG. 8 shows in greater detail another part of the arrangement of FIG. 6 which controls the modification of data stored in a random access memory.

FIG. 8 shows the HSR control circuit 620 and the depth RAM, 622 in more detail. The circuit performs a method as described hereinbefore with reference to FIG. 4, for determining into which case each input pixel falls.

The address UADD of the input pixel is supplied by the address ALU 606 (FIG. 6) to address (A) inputs 630 of the foreground depth RAM 626 and the background depth RAM 628. Input 611 receives input depth values ZIN and is connected to the input port 800 of RAM 626, to a first input 802 of a first digital comparator 804, to a first input 806 of a two-input multiplexer 808 and to a first input 810 of a second digital comparator 812. The data ZIN comprise 24 bits per pixel, and suitable 24-bit comparators can be made using multiple TTL 4-bit comparator chips such as Signetics' 7485. The 24-bit RAMs 626 and 628 may comprise any suitable RAM chips, arranged for example in banks of six 64K by 4-bit DRAMs. As mentioned hereinbefore, the address (A) inputs 630 shown implicitly include the necessary address strobe and chip enable signals, with the exception of write-enable signals WEF and WEB which are applied to inputs 816 and 818 of the foreground depth RAM 626 and background depth RAM 628 respectively.

The foreground depth RAM 626 has a data output 820 for supplying stored depth data ZFO to a second input 822 of the first comparator 804, and to the second input 824 of the multiplexer 808. The comparator 804 has two logic outputs, 826 and 828. Output 826, which goes high when the value ZFO is greater than the input value ZIN, is connected to a first input of an OR-gate 830. The second output 828 of the comparator 804, which goes high when ZIN=ZFO, is connected to a first input of an AND-gate 832, the output 834 of which is connected to a second input of the OR-gate 830. The output 836 of the OR-gate forms the foreground write enable output 621 (WEF) of the HSR circuit 620, and is thus connected to the WE input 816 of the foreground depth RAM 626, and to a control input 838 of the multiplexer 808 and to the control input 840 of a second two-way multiplexer 842.

An output 844 of the first multiplexer 808 is connected to the data input 846 of the background depth RAM 628, and carries new background depth data ZBI. The multiplexer 808 operates so that the data ZBI equals the input depth data ZIN when its control input 838 is low (WEF=0) and equals the stored foreground data ZFO when input 838 is high (WEF=1). The data output 848 of the background depth RAM 628 carries stored background data ZBO and is connected to a second input 850 of the second comparator 812. A logic output 852 of the comparator 812 forms the background write-enable output 623 (WEB) and is connected to the WE input 818 of the background RAM 628. The comparator output signal WEB is high (logic '1') when the stored depth data ZBO is greater in value than the input depth data ZIN, and is low otherwise.

Inputs 655 and 613 supply stored foreground colour data UCFO and input colour data CIN respectively to the first and second inputs 854 and 856 of the second multiplexer 842, whose single 24-bit data output 858 forms the output 660 which carries the new background colour data CBI. The multiplexer 842 operates so that CBI equals CIN when signal WEF is low and CBI equals UCFO when signal WEF is high.

The colour input 613 (CIN) is also connected directly to the output 656, which carries the new foreground colour data CFI. The mixing value input 615 (MIN) is connected directly to the new mixing value output 658 (MI) and also to a first input 860 of a third digital comparator 862, the second input 864 of which is connected to input 675 which receives the stored mixing value UMO read from the RAM 650. In this embodiment, mixing values are 4-bit numbers and 100 per cent weighting fraction is represented by the mixing value fifteen (1111 binary). The comparator 862 can thus be constructed out of a single 7485 4-bit comparator chip. An output 866 of the comparator 862 is connected to a second and final input of the AND gate 832 and signals when high that the input mixing value MIN is greater than the stored value UMO.

In operation, when supplied with input values UADD (corresponding to pixel address X,Y), CIN, ZIN, MIN for the pixel (X,Y), the apparatus of FIG. 8 performs a method corresponding closely to that described hereinbefore with reference to FIG. 4. The comparison step 404 is performed by the second comparator 812 and the comparison steps 408 and 428 are performed by the first comparator 804. If ZIN>ZB>ZF then both write-enable signals WEB and WEF are low and no modification of the contents of the RAMs 622/624 can result, corresponding to the performance of section AA' of the flow charts of FIGS. 3 and 4. If ZB>ZIN>ZF, then WEF=0 but WEB=1 and the data ZIN and CIN are written into the background depth RAM 626 and background colour RAM 652 respectively, at the address UADD, effectively performing the section BB' of the flow charts.

In the borderline case ZB>ZIN=ZF, WEB=1 but the value of WEF depends on the output of the third comparator 862, which thus corresponds to the result of the comparison in step 430 (FIG. 4). If MIN<UMO, then the output 866 of the comparator 862 is low and WEF=0, causing the section BB' to be performed as for the case ZB>ZIN>ZF. In the case where ZB>ZF>ZIN, and in the borderline case ZIN=ZF when MIN>UMO, then both WEB and WEF are high (logic '1'). This causes the section CC' to be executed. The multiplexers 808 and 842 select the previously stored foreground values UCFO and ZFO for the new background values CBI and ZBI respectively, and WEB=1 causes them to be written into the background RAMs 652 and 628 respectively. At the same time, WEF=1 causes the input values CIN and ZIN to be written into the foreground RAMs 648 and 626 respectively, and the input value MIN to be written into the mixing value RAM 650.

Clearly, the operation of the circuit might be synchronized, for example by means of sequencer 608 (FIG. 6), so that the comparators and multiplexers have time to settle to their correct state before the data they produce are used to modify the contents of the RAMs 622 and 624. In general, a system clock signal would be available to as many components as require it, and the sequencer 608 can use this signal to generate the timing signals required for correct operation of the circuit. The sequencer 608 may for example include a read-only memory (ROM) or a field-programmable logic device (FPLD) and state registers, as are well-known in the art.

Means (not shown) may also be provided for resetting the memory contents to a clear background state at the start of building up each image. It is not necessary to clear the background colour RAM 652 if the foreground colour RAM 648 is cleared to a uniform background colour and the mixing values in the RAM 650 cleared to 100 per cent. The depth RAMs 626 and 628 may be cleared to the maximum depth value to represent the extreme distance. Such operations are entirely conventional, and some RAM devices, such as Hitachi's HM53461P video DRAM, provide special rapid blanking facilities, whereby entire lines of pixels can be set to a uniform value in a single write cycle.

FIG. 9 shows the mixing circuit 664 of FIG. 6, which forms the output colour values $RGB_{OUT}$ from the contents of the display RAM 624, in more detail. The display timing circuit 640 controls access to the display RAM 624 via the address and data multiplexing described hereinbefore with reference to FIG. 7. The circuit 640 may comprise a standard video controller integrated circuit such as Texas Instruments' Video System Controller (VSC) TMS 34061, which would normally operate simply to read the final RGB or HSV colour values directly from a single display RAM, but in this case will read three values DCFO, DMO and CBO for each pixel. Since the foreground colour RAM 648, the mixing value RAM 650 and the background colour RAM 652 comprise separate RAMs, accessible in parallel, it is only necessary that the address and timing signals that are generated by the VSC chip are applied to all three RAMs in parallel.

The foreground colour output 662 (DCFO) of the RAM 648, which comprises three 8-bit outputs (R,G,B) is connected to 8-bit inputs of a first triple 8-bit by 4-bit multiplier 900, which together form the input 663 of the mixer 664. The mixing value output 666 (DMO) of the RAM 650 is connected to the 4-bit input 902 of the multiplier 900, which forms the input 667 of the mixer 664. The output 904 of the multiplier 900 is truncated to three 8-bit values and applied to a first summing input 906 of a triple 8-bit adder 908. The mixing value input 667 is also connected to the subtracting input 910 of a 4-bit subtractor 912. A 4-bit adding input 914 of the subtractor 912 is tied to the constant 4-bit value representing a 100 per cent mixing function, namely fifteen (1111 binary). The 4-bit output 918 of the subtractor 912 is connected to the 4-bit input 920 of a second triple 8-bit by 4-bit multiplier 922 which, in common with the first multiplier 902, is controlled by signals provided by the display timing circuit 640 via clock and synchronizing connections 924 and 926. The 24-bit background colour output 668 (CBO) of the RAM 652 is connected to the three 8-bit inputs 928 of the second multiplier 922, and together form the input 669 of the mixing circuit 664.

The output 930 of the second multiplier 922, truncated to three 8-bit values, is connected to a second summing input 932 of the adder 908, whose output 934 (CO), again truncated to three 8-bit values, forms the final colour output 670 ($RGB_{OUT}$) of the arrangement shown in FIG. 6. The output 670 ($RGB_{OUT}$) is connected to a display, via a colour look-up table and digital to analogue converters, if necessary, as described hereinbefore with reference to FIG. 1. The display timing circuit 640 also provides the display synchronization output 672 (SYNC) as shown in FIG. 6.

In operation, the timing circuit 640 has complete access to whichever bank ('A' or 'B') of the display RAM 624 is currently selected by the signal $\overline{UA}/UB$ for display output purposes. The circuit 640 generates all the addresses required to scan the pixels of the image in synchronism with the scanning of a raster-scan display device, such as a CRT. The multipliers 902 and 922 are also synchronized with this operation, and calculate weighted versions of the foreground and background colour values DCFO and CBO, for combination by the adder 908 into the output colour values CO. The subtractor 912 converts the stored weighting fraction DMO for the foreground colour value into the complementary weighting fraction required for the background colour value, namely fifteen minus the value of DMO. The adder 908 and subtractor 912 can operate asynchronously or synchronously. The mixing circuit 664 can be constructed to a custom design or using standard TTL or ECL arithmetic and logic components. Clearly, the multipliers chosen must be capable of performing at least one multiplication per pixel at the required output pixel rate, which is determined by the refresh and resolution requirements of the display.

Mixing of the colour value could also be performed in the analogue domain, although the DACs 13R,G,B (FIG. 1) would require to be duplicated, or work twice as fast. The mixing values DMO do not need converting to analogue first, since scalers for multiplying an analogue signal by a 4-bit value can be readily constructed using CMOS analogue switches.

For the sake of simplicity, the embodiments described have comprised only one set of background pixel data and furthermore transparency of a pixel has been described only in connection with antialiasing. Those skilled in the art will readily appreciate how the embodiments can be modified to store further sets of background data and/or to implement transparency for general purposes.

From reading the present disclosure, other modifications will be apparent to persons skilled in the art. Such modifications may involve other features which are already known in the design and use of electronic graphics systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization of one or more of those features which would be obvious to persons skilled in the art, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A method of generating in the form of an array of picture elements (pixels) a two-dimensional image representing a three-dimensional scene, the method comprising:
   (a) storing in a memory a set of foreground pixel data defining a foreground colour and depth for each pixel of the image;
   (b) selectively modifying the stored foreground data in response to a series of input pixel data defining colour and depth for a series of pixels of the image; and
   (c) forming output pixel data using the stored foreground colour for each pixel; characterized in that:
   the step (a) further comprises storing at least one set of background pixel data, each such set defining a background colour and depth for each pixel of the image; in that
   the step (b) comprises selectively modifying both the stored foreground and background data in response to the input pixel data; and in that
   the step (c) comprises forming the output pixel data by combining the stored foreground and background colours for each pixel in proportions defined by a mixing value associated with that pixel.

2. A method as claimed in claim 1 wherein the mixing value for each pixel is dependent on the fractional area of that pixel which falls within the representation of a given surface in the three-dimensional scene.

3. A method as claimed in claim 1 or claim 2 wherein the input pixel data includes a mixing value for each input pixel of the series and at least the stored foreground pixel data also includes a mixing value for each pixel of the image.

4. A method as claimed in claim 2, wherein the input pixel data includes a mixing value for each input pixel of the series and at least the stored foreground pixel data also includes a mixing value for each pixel of the image.

5. A method as claimed in any of claims 1 to 3 or 4, wherein in step (b) the stored data are selectively modified depending on the input depth for each pixel so that, with depth increasing away from a notional viewer of the scene:
   (i) if the input depth for that pixel is greater than the stored foreground and background depths for that pixel, the stored foreground and background pixel data for that pixel are left unchanged,
   (ii) if the input depth for that pixel lies between the stored foreground and background depths for that pixel, the input pixel data is stored in place of the stored background data for that pixel, and
   (iii) if the input depth for that pixel is less than both the stored foreground and background depths for that pixel, the stored foreground data for that pixel are stored in place of the stored background data for that pixel and the input pixel data are stored in the foreground set in place of the stored foreground data for that pixel.

6. An arrangement for generating in the form of an array of picture elements (pixels) a two-dimensional image representing a three-dimensional scene, the arrangement comprising:

means for storing in a memory a set of foreground pixel data defining a foreground colour and depth for each pixel of the image;

means for selectively modifying the stored foreground data in response to a series of input pixel data defining colour and depth for a series of pixels of the image; and means for forming output pixel data using the stored foreground colour for each pixel; characterized in that:

the arrangement further comprises means for storing in a memory at least one set of background pixel data, each such set defining a background colour and depth for each pixel of the image; in that the means for selectively modifying the stored foreground data further comprises means for selectively modifying the stored background data in response to the input pixel data; and in that the means for forming the output pixel data comprises means for combining the stored foreground and background colours for each pixel in proportions defined by a mixing value associated with that pixel.

7. An arrangement as claimed in claim 6 wherein the mixing value for each pixel is dependent on the fractional area of that pixel which falls within the representation of a given surface in the three-dimensional scene.

8. An arrangement as claimed in claim 6 wherein the input pixel data include(s) a mixing value for each input pixel of the series and at least the stored foreground pixel data also include(s) a mixing value for each pixel of the image.

9. An arrangement as claimed in claim 7 wherein the input pixel data include(s) a mixing value for each input pixel of the series and at least the stored foreground pixel data also include(s) a mixing value for each pixel of the image.

10. An arrangement as claimed in any of claims 6 to 8 or 9 wherein the selective modifying means is responsive to the input depth for each pixel so that, with depth increasing away from a notional view of the scene:
  (i) if the input depth for that pixel is greater than the stored foreground and background depths for that pixel, the stored foreground and background pixel data for that pixel are left unchanged,
  (ii) if the input depth for that pixel lies between the stored foreground and background for that pixel, the input pixel data for that pixel is stored in place of the stored background data for that pixel, and
  (iii) if the input depth for that pixel is less than both the stored foreground and background depths for that pixel, the stored foreground data for that pixel are stored in place of the stored background data for that pixel and the input data are stored in the foreground set in place of the stored foreground data for that pixel.

11. An electronic graphics system comprising an arrangement as claimed in any of claims 5, 8 or 9, the system further comprising a memory for storing the foreground and background pixel data.

12. A system as claimed in claim 11 wherein the memory is arranged to allow access to both foreground and background pixel data in parallel.

13. A system as claimed in claim 11 further comprising input means for defining the scene to be represented and display means for displaying the image generated.

14. An electronic graphics system comprising an arrangement as claimed in claim 10, the system further comprising a memory for storing the foreground and background pixel data.

15. A system as claimed in claim 14 wherein the memory is arranged to allow access to both foreground and background pixel data in parallel.

16. A system as claimed in claim 12 further comprising input means for defining the scene to be represented and display means for displaying the image generated.

17. A system as claimed in claim 15 further comprising input means for defining the scene to be represented and display means for displaying the image generated.

* * * * *